United States Patent
Seta

(10) Patent No.: US 8,652,618 B2
(45) Date of Patent: Feb. 18, 2014

(54) MULTI-LAYER FILM

(75) Inventor: Yasushi Seta, Tokyo (JP)

(73) Assignee: Riken Technos Corporation, Tokyo (JP)

( * ) Notice: Subject to any disclaimer, the term of this patent is extended or adjusted under 35 U.S.C. 154(b) by 973 days.

(21) Appl. No.: 12/461,540

(22) Filed: Aug. 14, 2009

(65) Prior Publication Data

US 2010/0047597 A1    Feb. 25, 2010

(30) Foreign Application Priority Data

Aug. 20, 2008   (JP) ................. 2008-211867

(51) Int. Cl.
| | | |
|---|---|---|
| B32B 7/02 | (2006.01) | |
| B32B 15/08 | (2006.01) | |
| B32B 27/08 | (2006.01) | |
| H01M 2/08 | (2006.01) | |

(52) U.S. Cl.
USPC ........... 428/212; 428/458; 428/461; 428/516; 429/163; 429/174

(58) Field of Classification Search
USPC ........... 428/212, 458, 461, 516; 429/163, 174
See application file for complete search history.

(56) References Cited

U.S. PATENT DOCUMENTS

| 4,310,578 A | 1/1982 | Katsura et al. | |
|---|---|---|---|
| 5,322,161 A | 6/1994 | Shichman et al. | |
| 7,048,822 B2 * | 5/2006 | Yamashita et al. | 156/334 |
| 7,510,799 B2 * | 3/2009 | Hatta et al. | 429/181 |
| 2009/0258173 A1 | 10/2009 | Hata | |

FOREIGN PATENT DOCUMENTS

| EP | 1 209 094 A1 | 5/2002 |
|---|---|---|
| JP | A-55-12029 | 1/1980 |
| JP | A-2003-288865 | 10/2003 |
| JP | 2005-203294 | * 7/2005 |
| JP | A-2006-305967 | 11/2006 |
| WO | WO 99/40634 A1 | 8/1999 |

OTHER PUBLICATIONS

Industrial Plastics: Theory and Application, Lokensgard, Erick (p. 468) Delmar Cengage Learning, Canada 2010.*
European Search Report issued in Application No. EP 09 16 7942; mailed on Nov. 13, 2009.

* cited by examiner

Primary Examiner — Kevin R Kruer
(74) Attorney, Agent, or Firm — Oliff PLC

(57) ABSTRACT

Purpose: The present invention provides a multi-layer film comprising a polyolefin film, an aluminum foil and a polyamide layer which are laminated sequentially, wherein the aluminum foil is adhered directly to the polyolefin film without any anchor coat agent or adhesive and the multi-layer film is excellent in adhesion strength between the polyolefin film and the aluminum foil and in low-temperature resistance.

The multi-layer film according to the present invention comprises an aluminum layer (B) subjected to chromium-free chemical conversion treatment, a polyolefin resin film (A) on one side of the layer (B) and a polyamide layer (C) on the other side of the layer (B), wherein the film (A) comprises a layer (A-1) composed of an acid-modified polyethylene resin (α) and a layer (A-2) composed of a crystalline polyethylene resin (β), a temperature at which the acid-modified polyethylene resin (α) has a crystallinity of 60%, $Tm_{\alpha 60}$, is lower than a temperature at which the crystalline polyethylene resin (β) has a crystallinity of 60%, $Tm_{\beta 60}$, and the layer (B) is present directly on the layer (A-1).

10 Claims, 1 Drawing Sheet

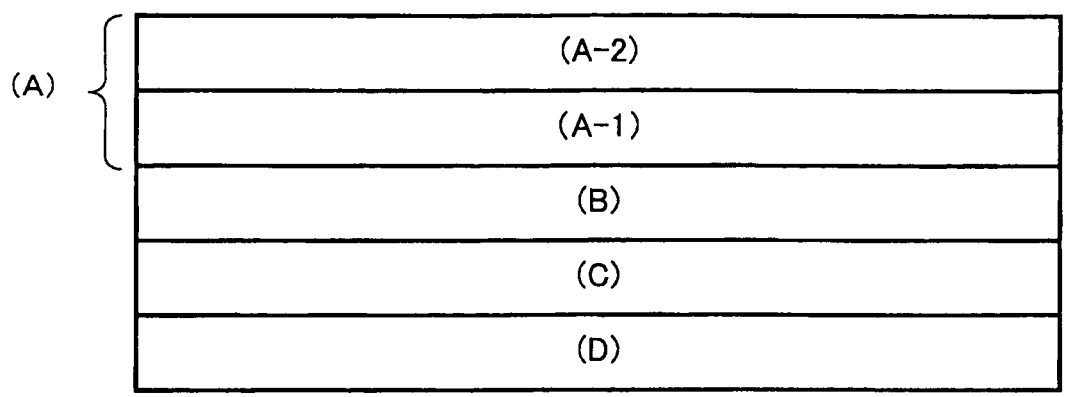

MULTI-LAYER FILM

FIELD OF THE INVENTION

The present invention relates to a multi-layer film which is useful, for example, for holding foods or daily necessaries or for holding electricity generating/storing elements for a secondary battery or an electric double-layer capacitor.

BACKGROUND OF THE INVENTION

As a packaging material for holding a content such as retort pouch foods including retort pouch curry, refills including shampoo refill and liquid detergent refill, and electricity generating elements for a secondary battery, wide use has been made of a composite multi-layer film comprising an aluminum foil with a layer of a polyolefin film layer on one side of the aluminum foil and a layer of a polyamide on the other side (see, for example, the following Patent Document 1). Polyolefin has a heat adhesion property and, therefore, a packaging material with a polyolefin film inside can be heat-sealed. Polyamide is superior in mechanical strength and, therefore, can increase durability of a packaging material.

A polyolefin film has conventionally been adhered to an aluminum foil via an anchor coat agent or an adhesive. Therefore, such a packaging material cannot hold a liquid that has such a strong permeating or solubilizing ability as to damage the anchor coat agent or the adhesive.

In addition, use has conventionally been made of a non-surface-treated aluminum foil. Therefore, a packaging material with such an aluminum foil cannot hold a liquid that damages aluminum, even if the liquid does not affect the adhesive layer.

Further, many researches have been made on lithium ion secondary batteries and electric double-layer capacitors as batteries for hybrid automobiles and electric cars. Conventionally, an electricity generating/storing element has been sealed in a metal vessel in lithium ion secondary batteries and electric double-layer capacitors. Due to the severe fuel efficiency standards imposed on automobiles, weight reduction of automotive parts has been pursued. It is very promising for weight reduction of automotives to use the composite multi-layer film as an exterior packaging material for secondary batteries.

However, organic solvents used as an electrolyte in an electricity generating/storing element for lithium ion secondary batteries and electric double-layer capacitors have a strong permeating or solubilizing ability and, therefore, damage the anchor coat agent, adhesive or aluminum. Therefore, the use of the above-mentioned composite multi-layer film results in a lithium ion secondary battery or an electric double-layer capacitor with less reliability.

In order to overcome these problems, a method called chromate treatment is widely known in which the surface of an aluminum foil is treated with chromic acid-type chemicals (see, for example, Patent Document 2). This treatment forms a coating on the surface which coating significantly increases corrosion resistance of the aluminum foil and allows the aluminum foil to adhere to a polyolefin film by heat lamination without any anchor coat agent or adhesive. However, this technique is accompanied with a serious problem of using chromium which is an environmental load substance.

Chromium-free chemical conversion treatments such as boehmite treatment (hydrothermal treatment) and phosphate treatment are known as a method for treating the surface of aluminum without chromium. These treatments attain corrosion resistance similar to that in the chromate treatment. However, if a polyolefin film is adhered to an aluminum foil subjected to chromium-free chemical conversion treatment by heat lamination without any anchor coat agent or adhesive in such a temperature range that the polyolefin film can be laminated to the aluminum foil without melt-adhering onto a processing machine, sufficient adhesion strength cannot be obtained between the polyolefin film and the aluminum foil.

Further, a composite multi-layer film needs to have a high low-temperature resistance when applied to a lithium ion secondary battery or an electric double-layer capacitor for an automobile battery. In the prior art, crystalline polypropylene has been used as the polyolefin film, taking much account of heat resistance. This results in unsatisfied low-temperature resistance. In order to improve the low-temperature resistance, it has been widely carried out to use a block copolymer as the crystalline polypropylene or to add rubber to the crystalline polypropylene. However, in that technique, such morphology appears that "islands" of the rubber as a modifier for the low-temperature resistance are dispersed in a "sea" of the crystalline polypropylene. This may cause permeation of liquid through the "islands". That is, organic solvents used in lithium ion secondary batteries and electric double-layer capacitors are at high risk of leakage in a long term, because they have a strong permeating or solubilizing ability.

[Patent Document 1] WO99/40634
[Patent Document 2] Japanese Patent Application Laid-Open 2003-288865

DISCLOSURE OF THE INVENTION

It is an object of the present invention to provide a multi-layer film comprising an aluminum foil subjected to chromium-free chemical conversion treatment, a layer of a polyolefin film on one side of the aluminum foil and a polyamide layer on the other side, wherein the aluminum foil is adhered directly to the polyolefin film without any anchor coat agent or adhesive and the multi-layer film is excellent in adhesion strength between the polyolefin film and the aluminum foil and in low-temperature resistance.

The inventor has found that where the polyolefin film comprises a heat-laminating layer composed of an acid-modified polyethylene resin ($\alpha$) and a heat-sealing layer composed of a specific polyethylene resin ($\beta$) having a higher crystal-fusion temperature than that of resin ($\alpha$) and the aluminum foil subjected to chromium-free chemical conversion treatment is laminated to the heat-laminating layer, the polyolefin film can be laminated to the aluminum foil without melt-adhering to a processing machine, at such a high temperature as to cause heat lamination between the heat-laminating layer and the aluminum foil, and the resulting multi-layer film is excellent in adhesion strength between the polyolefin film and the aluminum foil and in low-temperature resistance.

Thus, the present invention provides a multi-layer film comprising an aluminum layer (B) subjected to chromium-free chemical conversion treatment, a polyolefin resin film (A) on one side of the layer (B) and a polyamide layer (C) on the other side of the layer (B), wherein the film (A) comprises a layer (A-1) composed of an acid-modified polyethylene resin ($\alpha$) and a layer (A-2) composed of a crystalline polyethylene resin ($\beta$), a temperature at which the acid-modified polyethylene resin ($\alpha$) has a crystallinity of 60%, $Tm_{\alpha 60}$, is lower than a temperature at which the crystalline polyethylene resin ($\beta$) has a crystallinity of 60%, $Tm_{\beta 60}$, and the layer (B) is present directly on the layer (A-1).

Also, the present invention provides a process for producing the multi-layer film, comprising the following steps:

1) laminating an aluminum layer (B) subjected to chromium-free chemical conversion treatment to one side of a polyolefin resin film (A), and 2) laminating a polyamide film (C) to the layer (B), wherein the film (A) comprises a layer (A-1) composed of an acid-modified polyethylene resin (α) and a layer (A-2) composed of a crystalline polyethylene resin (β), a temperature at which the acid-modified polyethylene resin (α) has a crystallinity of 60%, $Tm_{\alpha 60}$, is lower than a temperature at which the crystalline polyethylene resin (β) has a crystallinity of 60%, $Tm_{\beta 60}$, and the step 1) is carried out by heat-laminating the layer (B) directly to the layer (A-1) at a temperature, $T_R$, which meets the following requirement (1):

$$Xc(T_R) \text{ of the resin}(\alpha) < 60\% \text{ and } Xc(T_R) \text{ of the resin } (\beta) \geq 60\% \quad (1)$$

wherein $Xc(T_R)$ is a crystallinity at $T_R$.

In the multi-layer film according to the present invention, the polyolefin resin layer is adhered strongly enough and directly to the aluminum layer subjected to chromium-free chemical conversion treatment without any anchor coat agent or adhesive. In addition, the present multi-layer film is excellent in low-temperature resistance. Therefore, the present multi-layer film is useful as a packaging material for holding a liquid which has a strong permeating or solubilizing ability or which damages non-treated aluminum, as a packaging material for holding a product to be stored at a low temperature, such as frozen sweets, e.g. ice cream, and as an exterior packaging material for lithium ion secondary batteries or electric double-layer capacitors for automobile batteries.

BRIEF DESCRIPTION ON THE DRAWING

FIG. 1 shows a multi-layer film according to the present multi-layer film.

PREFERRED EMBODIMENTS OF THE INVENTION

One embodiment of the present multi-layer film is shown in FIG. 1. As illustrated in FIG. 1, the present multi-layer film comprises an aluminum layer (B) subjected to chromium-free chemical conversion treatment, a polyolefin resin film (A) on one side of the layer (B) and a polyamide layer (C) on the other side of the layer (B). The present multi-layer film may further comprise a polyester resin layer (D) on the layer (C). The film (A) comprises at least two layers, a layer (A-1) composed of an acid-modified polyethylene resin (α) and a layer (A-2) composed of a crystalline polyethylene resin (β). The layer (A-1) is positioned directly in contact with the layer (B). The layer (A-2) will be innermost when a bag is made of the multi-layer film.

(A) Polyolefin Resin Film

The polyolefin resin film (A) comprises a layer (A-1) composed of an acid-modified polyethylene resin (α) and a layer (A-2) composed of a crystalline polyethylene resin (β).

The acid-modified polyethylene resin (α) and the crystalline polyethylene resin (β) are selected so that a temperature at which the resin (α) has a crystallinity of 60%, $Tm_{\alpha 60}$, is lower than a temperature at which the resin (β) has a crystallinity of 60%, $Tm_{\beta 60}$, preferably lower than a temperature at which the resin (β) has a crystallinity of 70%, $Tm_{\beta 70}$, more preferably lower than a temperature at which the resin (β) has a crystallinity of 80%, $Tm_{\beta 80}$. If the aforesaid relation is not met, some troubles such as melt-adhesion of the film (A) onto a processing machine may occur when the film (A) is heat-laminated on its (A-1) side to the layer (B).

The temperatures mentioned above, such as $Tm_{\alpha 60}$ and $Tm_{\beta 60}$, are determined in a DSC fusion curve of the corresponding resin. The temperature at which the resin (β) has a crystallinity of 60%, $Tm_{\beta 60}$, for example, means that in the DSC fusion curve of the resin (β), a ratio of the fusion enthalpy in a temperature range above $Tm_{\beta 60}$ to the total fusion enthalpy is 60%. Unless otherwise noted, DSC fusion curves referred to in the present specification are obtained by carrying out DSC measurement using DSC Q1000 type (ex TA Instruments) according to the following temperature profile: a sample is kept at 230 degrees C. for 5 minutes, cooled to −10 degrees C. at a rate of 10 degrees C./min., kept at −10 degrees C. for 5 minutes and then heated to 230 degrees C. at a rate of 10 degrees C./min.

The acid-modified polyethylene resin (α) constituting the layer (A-1) is selected so as to meet the requirement, $Tm_{\alpha 60} < Tm_{\beta 60}$, as described above. In view of the heat resistance of the resulting multi-layer film, the resin (α) preferably has a $Tm_{\alpha 60}$ of 100 degrees C. or higher, more preferably 105 degrees C. or higher, still more preferably 110 degrees C. or higher. The layer (A-1) is adhered directly onto the layer (B) in a heat lamination process of the film (A) on the layer (B). Therefore, a lower $Tm_{\alpha 60}$ of the resin (α) allows a lower heat lamination temperature. However, in a case where the multi-layer film is used as a packaging material for a liquid having a strong permeating or solubilizing ability, or is subjected to heat treatment such as retorting, a higher $Tm_{\alpha 60}$ is preferred. Considering the upper limit of heat resistance of the crystalline polyethylene resin (β) constituting the layer (A-2) mentioned below, the upper limit of $Tm_{\alpha 60}$ is preferably 130 degrees C., more preferably 125 degrees C.

Examples of the acid-modified polyethylene resin (α) include, for example, polyethylene resins modified with an unsaturated carboxylic acid or derivatives thereof. The resin (α) has an enhanced adhesion strength with the layer (B) because of the acid modification. Examples of the unsaturated carboxylic acid include, for example, maleic acid, itaconic acid and fumaric acid. Examples of the derivatives include, for example, esters and anhydrides such as maleic acid monoester, maleic acid diester, maleic anhydride, itaconic acid monoester, itaconic acid diester, itaconic anhydride, fumaric acid monoester, fumaric acid diester and fumaric anhydride. The polyethylene resin includes, for example, linear polyethylene, ultra low density polyethylene, high density polyethylene, ethylene-vinyl acetate (VA) copolymer, ethylene-ethyl acrylate (EA) copolymer and ethylene-methacrylate copolymer. The acid-modified polyethylene resin (α) may be used alone or in combination. The resin (α) may be used together with a non-acid-modified polyethylene resin as far as the objects of the present invention are not hindered. In a case where the resin (α) is a mixture of such, $Tm_{\alpha 60}$ is determined in a DSC fusion curve of the mixture.

Specific examples of the acid-modified polyethylene resin (α) include Admer (trademark, ex Mitsui Chemicals, Inc.), Adtex (trademark, ex Japan polyethylene Corp.), Polybond (trademark, ex Crompton) and Bondfast (trademark, ex Sumitomo Chemical Co., Ltd.).

The crystalline polyethylene resin (β) constituting the layer (A-2) is selected so as to meet the requirement, $Tm_{\alpha 60} < Tm_{\beta 60}$, preferably $Tm_{\alpha 60} < Tm_{\beta 70}$, more preferably $Tm_{\alpha 60} < Tm_{\beta 80}$, as described above. In view of heat resistance of the resulting multi-layer film, $Tm_{\beta 60}$ is preferably 115 degrees C. or higher, more preferably 120 degrees C. or higher, still more preferably 125 degrees C. or higher. The upper limit of $Tm_{\beta 60}$ is not particularly limited. This is practically around 135 degrees C., because the resin (β) is a polyethylene.

Examples of the crystalline polyethylene resin (β) include, for example, ethylene homopolymers and random copolymers of ethylene and a small amount of a comonomer such as 1-butene, 1-hexene and 1-octene, more specifically high density polyethylene, high-pressure low density polyethylene, metallocene-catalyzed linear polyethylene having an ultra low to high density, Burckhardt-catalyzed long linear branched polyethylene having an ultra low to high density, and linear polyethylene having an ultra low to high density. The crystalline polyethylene resin (β) may be used alone or in combination. In a case where the resin (β) is a mixture of such, $Tm_{\beta 60}$ is determined in a DSC fusion curve of the mixture.

Commercially available examples of the crystalline polyethylene resin (β) include Evolue SP4530 and HI-ZEX 3300F (ex Prime Polymer Co., Ltd.), Novatec HD HY560 (ex Japan Polyethylene Corp.) and UBE Super Polyethylene UMERIT 4040F (ex Ube Industries Ltd.).

The crystalline polyethylene resin (β) is heat-adhesive. Therefore, the resulting multi-layer film can be formed with ease into a bag with the layer (A-2) being inside and the bag can be heat-sealed with ease at the open side.

The polyolefin resin film (A) may comprise another polyolefin resin layer between the layer (A-1) and the layer (A-2). The other layer may have a water absorption property and an oxygen absorption property.

The polyolefin resin film (A) may be produced with a desired thickness by coextruding the acid-modified polyethylene resin (α), the crystalline polyethylene resin (β) and, optionally, other resins in a T-die process or inflation process.

The polyolefin resin film (A) may be drawn as far as the heat sealability is not damaged. Drawing in a low ratio enhances crystallinity of the film (A), which decreases penetration of water which may deteriorate the performance of a lithium ion secondary battery or an electric double-layer capacitor.

(B) Aluminum Layer Subjected to Chromium-Free Chemical Conversion Treatment

The chromium-free chemical conversion treatment is to form a coating using no chromium and includes a hydrothermal treatment (also called boehmite treatment) and a treatment with chromium-free chemicals, e.g., phosphates such as zinc phosphate and manganese phosphate, and metal salts of organic acids, including iron, zinc, manganese, copper, nickel, cobalt, vanadium or scandium salts of carboxylic acids such as oxalic acid and acetic acid. The layer (B) in the present invention may be obtained by subjecting an untreated aluminum foil to the afore-said treatment.

(C) Polyamide Layer

Polyamide is superior in mechanical strength. Therefore, this layer can enhance durability of the obtained multi-layer film. Polyamide to be used is not particularly limited and includes, for example, Nylon 6, Nylon 11, Nylon 12, Nylon 66, Nylon 610, Nylon 6T, Nylon 6I, Nylon 9T, Nylon M5T, Nylon 612, Kevlar (trademark, ex DuPont) and Nomex (trademark, ex DuPont).

Examples of commercially available polamide include UBE Nylon (Nylon 6), UBE Nylon 66 (Nylon 66) and UBESTA (Nylon 12) manufactured by Ube Industries Ltd., ARAMIN (Nylon 6, 66, 610, etc.) manufactured by Toray Industries Ltd., Toyobo Nylon (Nylon 6, 66, 6T, etc.) manufactured by TOYOBO Co., Ltd., NOVAMID (Nylon 6, 66, 12) manufactured by Mitsubishi Engineering-Plastics Corp., YUNITIKA Nylon 6 and YUNITIKA Nylon 66 manufactured by YUNITIKA Ltd., and Leona (Nylon 66) manufactured by Asahi Kasei Chemicals Corp.

In view of mechanical strength, a biaxially-drawn polyamide film may be particularly suitable for use as the layer (C), such as commercially available Emblem (trademark, ex YUNITIKA Ltd.) and Mictron (trademark, ex Toray Industries Ltd.).

(D) Polyester Resin Layer

This layer is an optional protective layer to be laminated to the layer (C). The layer (C) has good mechanical strength, but is very weak to liquids which have a high permeating or solubilizing ability. When the multi-layer film composed of the layers (A) to (C) is formed into a packaging bag with the layer (C) being outermost, filled with a liquid having a high permeating or solubilizing ability and sealed at the open side of the bag, the content may spill from the bag. Therefore, the layer (D) on the layer (C) is advantageous.

The polyester resin constituting the layer (D) is not particularly limited and includes, for example, polyethylene terephthalate (PET), polybutylene terephthalate (PBT), polyethylene naphthalate (PEN), polytrimethylene terephthalate (PTT) and polybutylene naphthalate (PBN).

Examples of commercially available polyester resin include VYLOPET (PET and PBT) manufactured by TOYOBO Co., Ltd., TORAYCON (PBT) manufactured by Toray Industries Ltd., NOVADURAN (PBT) manufactured by Mitsubishi Engineering-Plastics Corp., PET resin manufactured by YUNITIKA Ltd., and PET resin, Teonex (PEN) and PBN resin manufactured by Teijin Chemicals Ltd.

In view of mechanical strength and solvent resistance, a biaxially-drawn polyester film may be particularly suitable for use as the layer (D) and include commercially available Lumirror (trademark ex Toray Industries Ltd.), TOYO-BOESTER film (trademark, ex TOYOBO Co., Ltd.) and EMBLET (trademark, ex YUNITIKA Ltd.).

A process for the preparation of the present multi-layer film comprises the following steps:

1) laminating an aluminum layer (B) subjected to chromium-free chemical conversion treatment to one side of a polyolefin resin film (A), and
2) laminating a polyamide film (C) to the layer (B), wherein the film (A) comprises a layer (A-1) composed of an acid-modified polyethylene resin (α) and a layer (A-2) composed of a crystalline polyethylene resin (β) and the step 1) is carried out by heat-laminating the layer (B) directly to the layer (A-1) at a temperature, $T_R$, meeting the following requirement (1):

$$Xc(T_R) \text{ of the resin}(\alpha)<60\% \text{ and } Xc(T_R) \text{ of the resin} (\beta) \geq 60\% \quad (1)$$

wherein $Xc(T_R)$ is a crystallinity at $T_R$.

The heat lamination may be carried out in a conventional manner at a temperature (temperature of a heated roller, $T_R$) meeting the requirement (1) above. $T_R$ is preferably in such a range where $Xc(T_R)$ of resin (α)<50%, more preferably <40%, and $Xc(T_R)$ of resin (β)≥70%, more preferably ≥80%. If $T_R$ is higher than the afore-said range, that is, $Xc(T_R)$ of the resin (β)<60%, preferably <50%, more preferably <40%, the polyolefin film (A) may be melt-adhered to the heated roller and, as a result, cannot be laminated. If $T_R$ is lower than the afore-said range, that is, $Xc(T_R)$ of the resin (α)≥60%, preferably ≥70%, more preferably ≥80%, adhesion strength between the film (A) and the layer (B) may be not enough.

The step 2) may be carried out by adhering the polyamide layer (C) to the side of the layer (B) of the film obtained in the step 1) above, in a dry lamination process. As an adhesive, a conventional two-pack type adhesive composed of a polyol-type main agent and an isocyanate-type curing agent may be used. Specific examples of such an adhesive may include a two-pack type adhesive, TAKELAC (polyol-type main agent)/TAKENATE (isocyanate-type curing agent) manufactured by Mitsui Chemicals Polyurethanes, Inc.

The multi-layer film further comprising the layer (D) on the layer (C) may be obtained by adhering the layer (D) onto the layer (C) of the film obtained in the step 2) above, in a dry lamination process as in the step 2). The same adhesives as those used in the step 2) may be used.

In the present multi-layer film thus obtained, the polyolefin resin film and the aluminum layer subjected to chromium-free chemical conversion treatment are adhered to each other strongly enough without any anchor coat agent or adhesive. Therefore, the present multi-layer film is useful as a packaging material for, particularly, a material such as liquid which has a strong permeating or solubilizing ability or which damages an untreated aluminum. The material to be contained includes, for example, retort pouch foods such as retort pouch curry, refills such as shampoo refill and liquid detergent refill, single use packs of goods such as industrial chemicals, solutions and solvents, and electricity generating/storing elements for lithium ion secondary batteries or electric double-layer capacitors. Also, the present multi-layer film is superior in low-temperature resistance and, therefore, is useful as a packaging material for frozen sweets such as ice cream. Further, the present multi-layer film is particularly suitable for use as an exterior packaging material for lithium ion secondary batteries or electric double-layer capacitors for automobile batteries.

The present invention will now be elucidated by referring to the Examples and Comparative Examples without being limited thereto.

Examples 1 to 4 and Comparative Examples 1 to 3

(1) Preparation of Polyolefin Film (A)

The acid-modified polyethylene resin (α) for the layer (A-1) and the crystalline polyethylene resin (β) for the layer (A-2) as shown in Table 1 were co-extruded with a T-type multi-manifold, multi-layer co-extrusion die to prepare a film (A) having a total thickness of 60 μm and a thickness ratio of the layer (A-1)/the layer (A-2) of 1/3. The resin temperature at the T-die outlet was 240 degrees C. and the take-off speed was 10 m/min. Further, the surface of the layer (A-1) was subjected to corona discharge treatment so as to have a wettability of 55 mN/m or more.

(2) Boehmite Treatment of an Aluminum Foil

An untreated aluminum foil manufactured by Toyo Aluminum K.K. (superfoil, JIS NO. A-8079, 40 μm thick) was rolled out and immersed in boiling water in a bath for 30 minutes and, then, the immersed part was wound up. These procedures were repeated to obtain a boehmite-treated aluminum foil (B).

(3) Heat Lamination of Polyolefin Film (A) onto Aluminum Foil (B)

The polyolefin film (A) and the boehmite-treated aluminum foil (B) which had been obtained above were heat-laminated to each other with an induction-heating type laminator, JD-DW, manufactured by TOKUDEN Co. Ltd., with the layer (A-1) of the polyolefin film being contacted with the aluminum foil. The temperature of the heated roller was set at the working temperature, $T_R$, as shown in Table 1. The pressure was 0.3 MPa and the take-up speed was 2 m/min.

(4) Dry Lamination of Polyamide Film (C)

A nylon film manufactured by YUNITIKA Ltd. (Emblem ONUM, 15 μm thick) was dry laminated onto the aluminum foil of the film obtained in the above-mentioned heat lamination step, using a two-pack type adhesive, TAKELAC A-310/TAKENATE A-3 (mass ratio, 12/1) manufactured by Mitsui Chemicals Polyurethanes, Inc. with a test laminator MODEL200 manufactured by Hirano Kinzoku, and then aged at 40 degrees C. for 90 hours.

The film thus obtained was subjected to the following tests.
Heat-Seal Strength of the Polyolefin Film The layer (A-2) of the polyolefin film (A) obtained in (1) above was melt-adhered to another layer (A-2) of the another polyolefin film (A) using a heat seal testing machine, type HG-100, manufactured by Toyo Seiki Seisaku-Sho Ltd. at a temperature of 175 degrees C. and a pressure of 0.2 MPa for 2 seconds to prepare a specimen. The specimen was then subjected to a T peel test with the machine direction of the films being in the pulling direction, using a tensile testing machine, type AE-CT, manufactured by Toyo Seiki Seisaku-Sho Ltd. to determine heat-seal strength between the two layers (A-2). The peel width was 25 mm, the peel speed was 100 mm/min. and the peel angle was 180°.
Heat-Laminating Ability (1)

In the film obtained in (3) above, the polyolefin film (A) was cut with 10×10 cross cuts at an interval of 3 mm. A pressure-sensitive adhesive tape was pressed onto the surface and then peeled off immediately. The criteria in the evaluation are as follows.

○: The tape was peeled off without a cut film adhered to the tape.

x: The tape was peeled off with a cut film(s) adhered to the tape.
Heat-Laminating Ability (2)

The polyolefin film (A) and the boehmite-treated aluminum foil (B) were melt-adhered to each other with the layer (A-1) being in contact with the aluminum foil (B) using a heat seal testing machine, type HG-100, manufactured by Toyo Seiki Seisaku-Sho Ltd. at a working temperature, $T_R$, as shown in Table 1 and a pressure of 0.3 MPa for 2 seconds to prepare a specimen. The specimen was then subjected to a T peel test using a tensile testing machine, type AE-CT, manufactured by Toyo Seiki Seisaku-Sho Ltd. with the machine direction of the film being in the pulling direction to determine lamination strength between the layer (A-1) and the aluminum foil. The peel width was 25 mm, the peel speed was 100 mm/min. and the peel angle was 180°.
Resistance to Electrolyte The multi-layer film obtained in (4) above was drawn with the polyolefin film (A) being in a concave side, using a mold with a concave section of 70 mm long×70 mm wide×4 mm deep and a press machine (laminated film-forming machine, ex Hohsen Corp., Ltd.) at a pressurization force of 5 MPs and pressurization speed of 1 s/100 mm. Another piece of the multi-layer film obtained in (4) above was cut in a size of 80 mm long×80 mm wide and laid on the drawn multi-layer film with the layers of the polyolefin film (A) facing each other. Then the three sides were heat sealed with a seal width of 5 mm at 175 degrees C. and 1 MPa for 2 seconds to prepare a bag. Ten milliliters of an electrolyte solution of lithium hexafluorophosphate in 1 mol/L dissolved in a mixture of ethylene carbonate, dimethyl carbonate and diethyl carbonate at a volumetric ratio of 1:1:1 (ex Kishida Chemical Co., Ltd.)

were poured into the bag via the open side. The open side was heat sealed with a seal width of 5 mm at 175 degrees C. and 1 MPa for 2 seconds to obtain a specimen. This specimen was subjected to an accelerated aging test for 100 days, using an environment test machine set at a temperature of 60 degrees C. and a humidity of 90%. The criteria in evaluation are as follows.

○: No abnormality such as liquid leakage was found.

x: Any abnormality was found.

Low-Temperature Resistance (1)

Another bag filled with the electrolyte solution prepared as in the above-mentioned electrolyte resistance test was left standing in an environment of −40 degrees C. for 24 hours and then was subjected to a dropping test in the same environment. In the test, the bag was dropped 100 times, with the side of the bag facing downward, in a stainless bat from a height of 1 m. The criteria in evaluation are as follows.

○: Neither tear in the bag nor liquid leakage was found.

x: Tear in the bag or liquid leakage was found.

Low-Temperature Resistance (2)

The same dropping test as in the low-temperature resistance (1) above was carried out with another bag, except that the bag was dropped in an upright position. The criteria in evaluation are as follows.

○: Neither tear in the bag nor liquid leakage was found.

x: Tear in the bag or liquid leakage was found.

Heat Resistance

Another bag filled with the electrolyte solution prepared as in the above-mentioned electrolyte resistance test was boiled in boiling water for 30 minutes. The criteria in evaluation are as follows.

○: Neither tear in the bag nor liquid leakage was found.

x: Tear in the bag or liquid leakage was found.

The materials used were as follows:

NE065: Admer NE065 (trademark, ex Mitsui Chemical Co., Ltd.), polyethylene modified with maleic anhydride, temperature for Xc of 60%: 111 degrees C., peak top temperature which temperature is highest among peaks in a DSC melting curve: 123 degrees C.;

NE827: Admer NE827 (trademark, ex Mitsui Chemical Co., Ltd.), polyethylene modified with maleic anhydride, temperature for Xc of 60%: 89 degrees C., peak top temperature which temperature is highest among peaks in a DSC melting curve: 124 degrees C.;

XE070: Admer XE070 (trademark, ex Mitsui Chemical Co., Ltd.), polyethylene modified with maleic anhydride, temperature for Xc of 60%: 54 degrees C., peak top temperature which temperature is highest among peaks in a DSC melting curve: 84 degrees C.;

SP4530: Evolue SP4530 (trademark, ex Prime Polymer Co., Ltd.), metallocene-catalyzed linear high density polyethylene, temperature for Xc of 60%: 126 degrees C., peak top temperature which temperature is highest among peaks in a DSC melting curve: 132 degrees C., density: 942 kg/cm$^3$;

4040F: UBE Super Polyethylene UMERIT 4040F (trademark, ex Ube Industries Ltd.), metallocene-catalyzed linear medium density polyethylene, temperature for Xc of 60%: 117 degrees C., peak top temperature which temperature is highest among peaks in a DSC melting curve: 127 degrees C., density: 938 kg/cm$^3$;

SP2520: Evolue SP2520 (trademark, ex Prime Polymer Co., Ltd.), metallocene-catalyzed linear low density polyethylene, temperature for Xc of 60%: 98 degrees C., peak top temperature which temperature is highest among peaks in a DSC melting curve: 121 degrees C., density: 928 kg/cm$^3$;

KF271: Kernel KF271 (trademark, ex Japan Polyethylene Corp.), metallocene-catalyzed linear low density polyethylene, temperature for Xc of 60%: 90 degrees C., peak top temperature which temperature is highest among peaks in a DSC melting curve: 127 degrees C., density: 913 kg/cm$^3$;

QE060: Admer QE060 (trademark, ex Mitsui Chemical Co., Ltd.), polypropylene modified with maleic anhydride, temperature for Xc of 60%: 126 degrees C., Tm$_\alpha$: 141 degrees C.; and F-704NP: F-704NP (trademark, ex Prime Polymer Co., Ltd.), homopolypropylene, temperature for Xc of 60%: 156 degrees C., peak top temperature which temperature is highest among peaks in a DSC melting curve: 161 degrees C.

TABLE 1

|   |   | Example 1 | Example 2 | Example 3 | Example 4 | Example 5 |
|---|---|---|---|---|---|---|
| (A-1) | Acid-modified polyethylene resin(α) | NE065 | XE070 | XE070 | XE070 | NE827 |
|   | Tmα*(° C.) | 123 | 84 | 84 | 84 | 124 |
|   | Tmα60 (° C.) | 111 | 54 | 54 | 54 | 89 |
| (A-2) | Crystalline polyethylene resin (β) | SP4530 | SP4530 | SP2520 | KF271 | 4040F |
|   | Crystallinity at Tmα, % | 72 | 72 | 76 | 70 | 39 |
|   | Crystallinity at Tmα60, % | 80 | 98 | 91 | 92 | 90 |
|   | Tmβ60 (° C.) | 126 | 126 | 98 | 90 | 117 |
| Evaluation result | Heat-seal strength, N/25 mm | 34.9 | 33.1 | 29.7 | 33.0 | 31.6 |
|   | Heat-laminating ability (1) | ○ | ○ | ○ | ○ | ○ |
|   | Working temperature(T$_R$), ° C. | 115 | 125 | 85 | 85 | 110 |
|   | Xc(T$_R$) of α, % | 50 | 3 | 10 | 10 | 27 |
|   | Xc(T$_R$) of β, % | 78 | 69 | 100 | 75 | 68 | 74 |
|   | Heat-laminating ability (2), N/25 mm | 29.8 | 38.6 | 30.5 | 28.3 | 37.6 | 28.8 |
|   | Resistance to electrolyte | ○ | ○ | ○ | ○ | ○ | ○ |
|   | Low-temperature resistance (1) | ○ | ○ | ○ | ○ | ○ | ○ |
|   | Low-temperature resistance (2) | ○ | ○ | ○ | ○ | ○ | ○ |
|   | Heat resistance | ○ | ○ | x | x | x | x |

|   |   | Comp. Example 1 | Comp. Example 2 | Comp. Example 3 |
|---|---|---|---|---|
| (A-1) | Acid-modified polyethylene resin(α) | NE065 | NE065 | QE060 |
|   | Tmα*(° C.) | 123 | 123 | 141 |
|   | Tmα60 (° C.) | 111 | 111 | 126 |
| (A-2) | Crystalline polyethylene resin (β) | SP2520 | KF271 | F-704NP |
|   | Crystallinity at Tmα, % | 0 | 15 | 86 |
|   | Crystallinity at Tmα60, % | 33 | 25 | 88 |
|   | Tmβ60 (° C.) | 98 | 90 | 156 |
| Evaluation | Heat-seal strength, N/25 mm | 28.9 | 32.1 | 27.4 |

TABLE 1-continued

| result | | | | | | | |
|---|---|---|---|---|---|---|---|
| | Heat-laminating ability (1) | x | nl** | x | nl** | ○ | ○ |
| | Working temperature($T_R$), °C. | 98 | 111 | 90 | 111 | 141 | 135 |
| | Xc($T_R$) of α, % | 79 | 60 | 87 | 60 | 27 | 43 |
| | Xc($T_R$) of β, % | 60 | 36 | 60 | 25 | 86 | 92 |
| | Heat-laminating ability (2), N/25 mm | 3.3 | — | 2.1 | — | 33.8 | 26.5 |
| | Resistance to electrolyte | x | — | x | — | ○ | ○ |
| | Low-temperature resistance (1) | x | — | x | — | x | x |
| | Low-temperature resistance (2) | x | — | x | — | x | x |
| | Heat resistance | x | — | x | — | ○ | ○ |

*Tmα: Peak top temperature which temperature is highest among peaks in a DSC melting curve of resin (α)
**nl: Film (A) could not be laminated.

As seen in Table 1, the multi-layer films of Examples 1 to 4 according to the present invention had enough heat-seal strength and excellent heat-laminating ability, solvent resistance and low-temperature resistance.

On the other hand, in Comparative Examples 1 and 2 where resin (α) and resin (β) do not meet the relation, $Tm_{\alpha 60} < Tm_{\beta 60}$, the polyolefin films (A) were subjected to heat lamination at a temperature of 111 degrees C. at which the crystallinity (Xc) of resin (α) constituting layer (A-1) is 60%. The polyolefin films (A) adhered to the heated roll so strongly as impossible to peel off and, therefore, could not be laminated. Then, the heat lamination was carried out at the decreased temperature of the heated roll, 98 degrees C. and 90 degrees C., respectively, so that the crystallinities (Xc) of resin (β) was 60% or higher. The polyolefin films (A) could be laminated. However, the resulting multi-layer films did not have enough adhesion strength between the polyolefin film (A) and the aluminum foil (B), solvent resistance and low-temperature resistance.

In Comparative Example 3, propylene resins were used as resin (α) and resin (β). The resulting multi-layer film had inferior low-temperature resistance.

Comparative Example 4

The same procedures as in Example 1 were repeated to prepare a multi-layer film, except that the temperatures for the heat lamination were as shown in Table 2. The results are as shown in Table 2.

TABLE 2

| | | Comp. Example 4 | |
|---|---|---|---|
| (A-1) | Acid-modified polyethylene resin (α) | NE065 | |
| | Tmα * (° C.) | 123 | |
| | Tmα60 (° C.) | 111 | |
| (A-2) | Crystalline polyethylene resin (β) | SP4530 | |
| | Crystallinity at Tmα, % | 72 | |
| | Crystallinity at Tmα60, % | 80 | |
| | Tmβ60 (° C.) | 126 | |
| Evaluation result | Heat-seal strength, N/25 mm | 34.9 | |
| | Heat-laminating ability (1) | X | nl ** |
| | Working temperature ($T_R$), °C. | 105 | 130 |
| | Xc($T_R$) of α, % | 72 | 0 |
| | Xc($T_R$) of β, % | 83 | 39 |
| | Heat-laminating ability (2), N/25 mm | 7.9 | — |
| | Resistance to electrolyte | X | — |
| | Low-temperature resistance (1) | X | — |
| | Low-temperature resistance (2) | X | — |
| | Heat resistance | X | — |

* Tmα: Peak top teperature which temperature is highest among peaks in a DSC melting curve of resin (α)
** nl: Film (A) could not be laminated.

As seen in Table 2, the polyolefin film (A) could be laminated when subjected to heat lamination at a temperature of 105 degrees C. which is lower than the temperature range meeting the requirement (1) above. However, the resulting multi-layer film did not have enough adhesion strength between the polyolefin film (A) and the aluminum foil (B), solvent resistance and low-temperature resistance. The polyolefin film (A) adhered to the heated roll when subjected to heat lamination at a temperature of 130 degrees C. which is higher than the temperature range meeting the requirement (1) above and, therefore, could not be laminated.

The invention claimed is:

1. A multi-layer film comprising:
   an aluminum layer (B) subjected to boehmite treatment,
   a polyolefin resin film (A) on one side of the layer (B) and
   a polyamide layer (C) on the other side of the layer (B),
   wherein the film (A) comprises a layer (A-1) composed of
      an acid-modified polyethylene resin (α) and a layer
      (A-2) composed of a crystalline polyethylene resin (β),
      a temperature at which the acid-modified polyethylene
      resin (α) has a crystallinity of 60%, $Tm_{\alpha 60}$, is lower than
      a temperature at which the crystalline polyethylene resin
      (β) has a crystallinity of 70%, $Tm_{\beta 70}$, and the layer (B)
      is present directly on the layer (A-1).

2. A multi-layer film according to claim 1, wherein a temperature at which the acid-modified polyethylene resin (a) has a crystallinity of 60%, $Tm_{\alpha 60}$, is lower than a temperature at which the crystalline polyethylene resin (β) has a crystallinity of 80%, $Tm_{\beta 80}$.

3. A multi-layer film according to claim 1, wherein $Tm_{\alpha 60}$ is 130 degrees C. or lower.

4. A multi-layer film according to claim 1, wherein $Tm_{\alpha 60}$ is 100 degrees C. or higher.

5. A multi-layer film according to claim 1, wherein $Tm_{\beta 60}$ is 115 degrees C. or higher.

6. A multi-layer film according to claim 1, wherein the film further comprises a polyester resin layer (D) on the layer (C).

7. A shaped article composed of the multi-layer film according to claim 1.

8. A shaped article according to claim 7, wherein the article is an exterior packaging material for a secondary battery.

9. A shaped article according to claim 7, wherein the article is an exterior packaging material for an electric double-layer capacitor.

10. A process for producing the multi-layer film according to claim 1, comprising the following steps:
   1) laminating an aluminum layer (B) subjected to boehmite treatment to one side of a polyolefin resin film (A), and
   2) laminating a polyamide film (C) to the layer (B),
   wherein the film (A) comprises a layer (A-1) composed of
      an acid-modified polyethylene resin (α) and a layer
      (A-2) composed of a crystalline polyethylene resin (β),
      a temperature at which the acid-modified polyethylene
      resin (a) has a crystallinity of 60%, $Tm_{\alpha 60}$, is lower than
      a temperature at which the crystalline polyethylene resin
      (β) has a crystallinity of 60%, $Tm_{\beta 60}$, and the step 1) is carried out by heat-laminating the layer (B) directly to the layer (A-1) at a temperature, $T_R$, meeting the following requirement (1):

$$Xc(T_R) \text{ of the resin } (\alpha) < 60\% \text{ and } Xc(T_R) \text{ of the resin } (\beta) \geq 60\% \quad (1)$$

wherein $Xc(T_R)$ is a crystallinity at $T_R$.

* * * * *